No. 749,894. PATENTED JAN. 19, 1904.
J. R. BINNS.
WOOD TURNING MACHINE.
APPLICATION FILED FEB. 28, 1903.

NO MODEL. 5 SHEETS—SHEET 1.

Witnesses. Inventor.
Chas. P. Day James R. Binns
Chas. O. Remington By Geo. W. Remington
    Attorney.

No. 749,894. PATENTED JAN. 19, 1904.
J. R. BINNS.
WOOD TURNING MACHINE.
APPLICATION FILED FEB. 28, 1903.
NO MODEL. 5 SHEETS—SHEET 2.

Witnesses. Inventor.
Chas. P. Day James R. Binns
Chas. Remington By Geo. H. Remington
Attorney.

No. 749,894. PATENTED JAN. 19, 1904.
J. R. BINNS.
WOOD TURNING MACHINE.
APPLICATION FILED FEB. 28, 1903.
NO MODEL. 5 SHEETS—SHEET 3.

Witnesses.
Chas. P. Day.
Chas. C. Remington

Inventor.
James R. Binns
By Geo. W. Remington
Attorney.

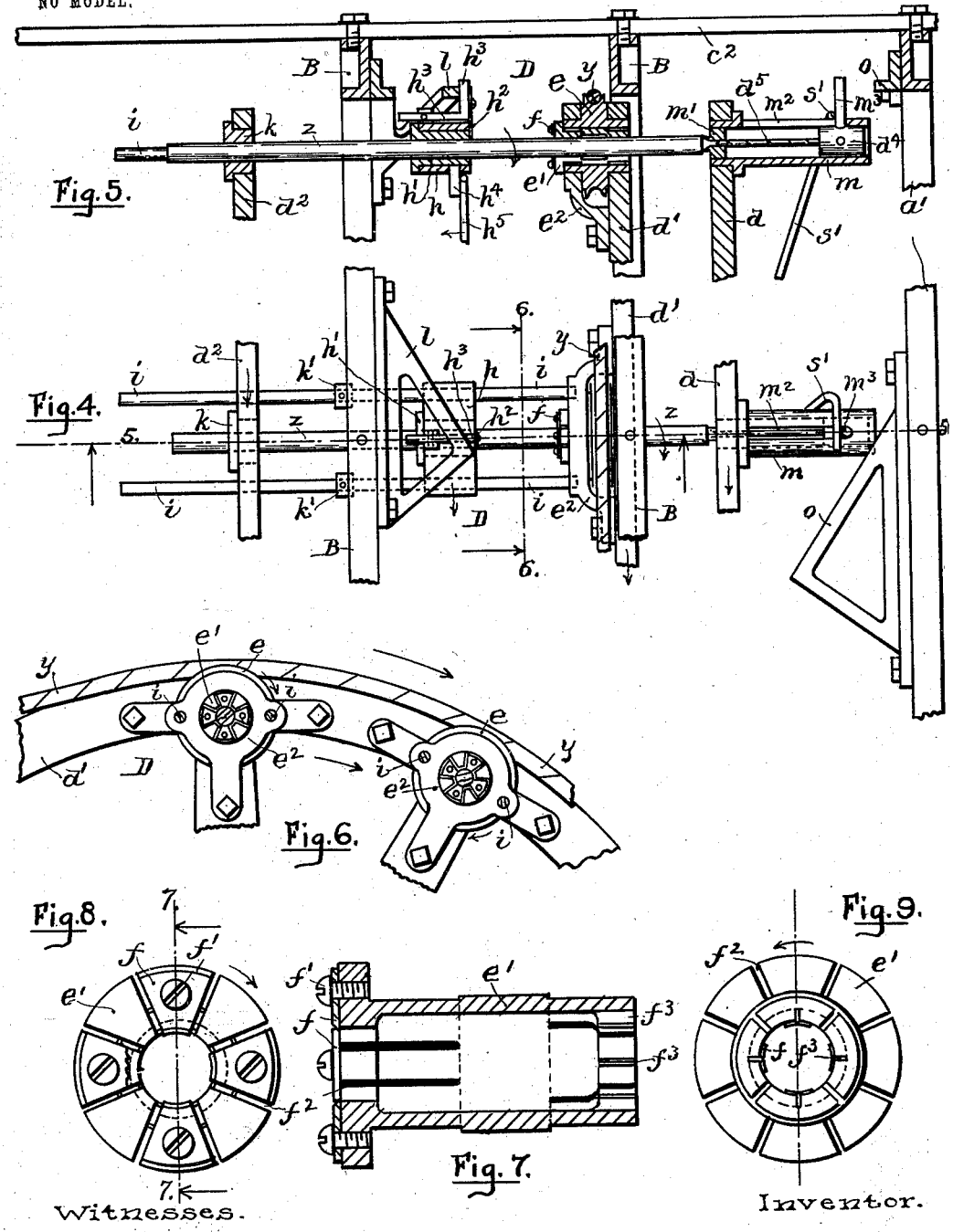

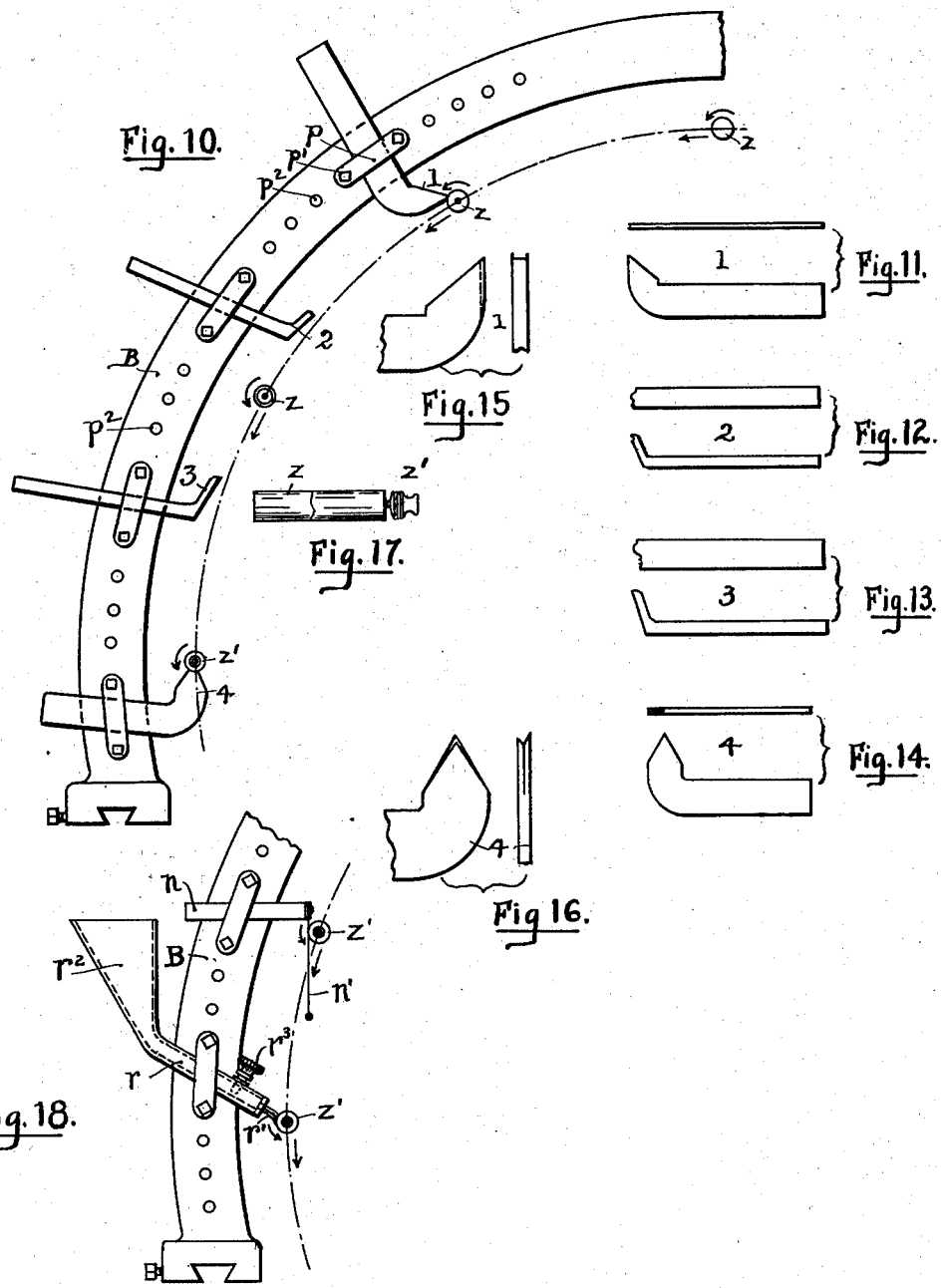

No. 749,894. Patented January 19, 1904.

UNITED STATES PATENT OFFICE.

JAMES R. BINNS, OF PROVIDENCE, RHODE ISLAND, ASSIGNOR OF ONE-HALF TO RODOLPH F. MORSE, OF PROVIDENCE, RHODE ISLAND.

WOOD-TURNING MACHINE.

SPECIFICATION forming part of Letters Patent No. 749,894, dated January 19, 1904.

Application filed February 28, 1903. Serial No. 145,482. (No model.)

*To all whom it may concern:*

Be it known that I, JAMES R. BINNS, a citizen of the United States of America, and a resident of Providence, in the county of Providence and State of Rhode Island, have invented certain new and useful Improvements in Wood-Turning Machines, of which the following is a specification.

My invention relates to certain novel improvements in wood-turning machines—such, for example, as are more especially adapted to mechanically produce wooden handles, knobs, tips, and kindred articles in an expeditious manner. In machines of the class referred to it has been usual heretofore in some cases to provide them with reservoirs or hoppers for loosely containing the wooden blanks, the latter in turn being fed singly therefrom to the cutting and finishing devices.

The object I have in view is to produce a wood-turning machine in which the handles or other articles made therein are formed from a series of slowly-traveling continuously and rapidly revolving wooden rods or blank stock, the diameter or thickness of each being equal to the maximum diameter of the article to be produced. The said rods are successively brought into engagement with a series of suitably-shaped stationary knives or cutters which shape, finish, and sever the articles singly and successively from the forward end of the rods, the latter being automatically advanced endwise or fed ahead the desired distance before each in turn again engages the cutters.

Figure 1:
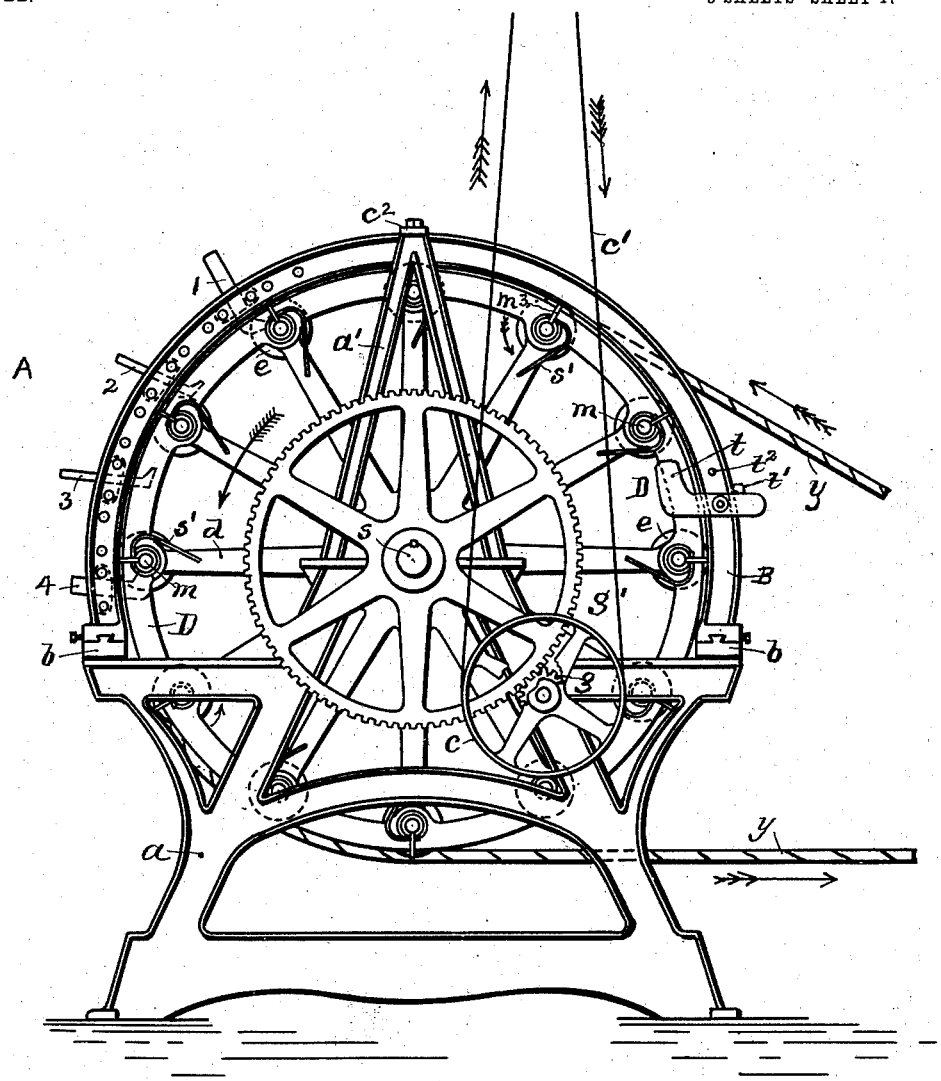
Figure 2:
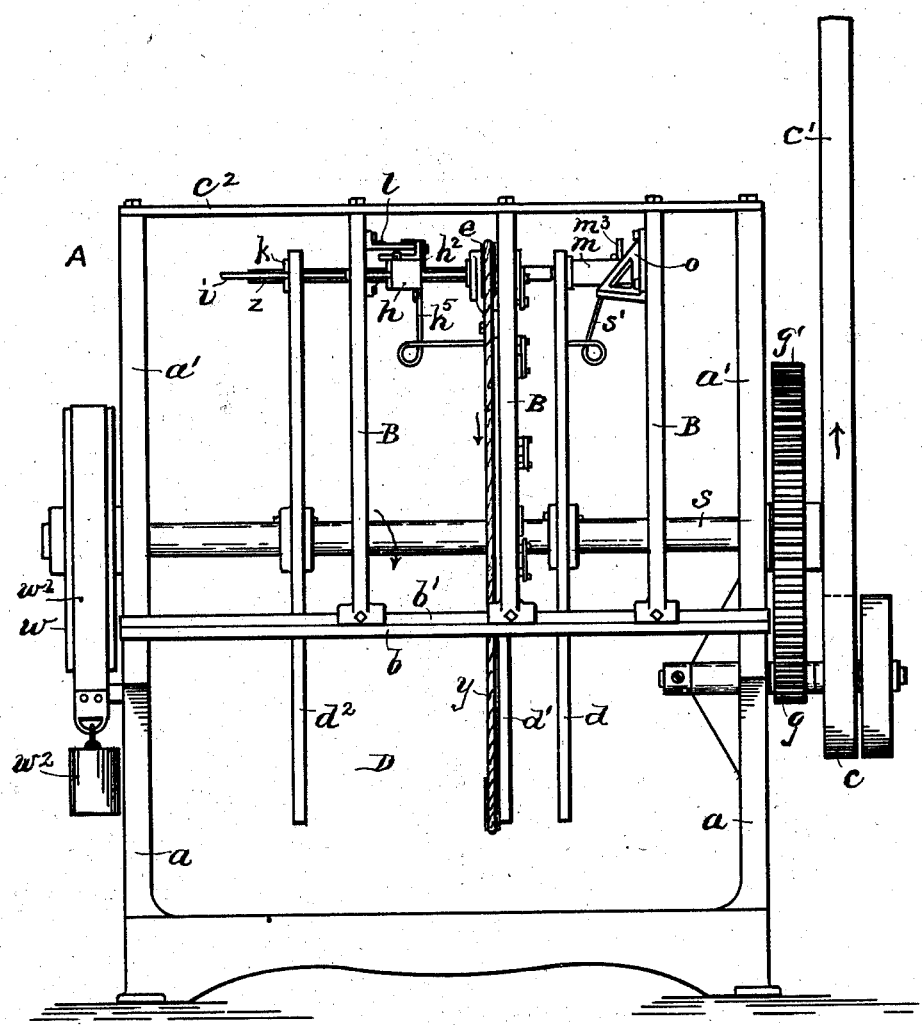
Figure 3:
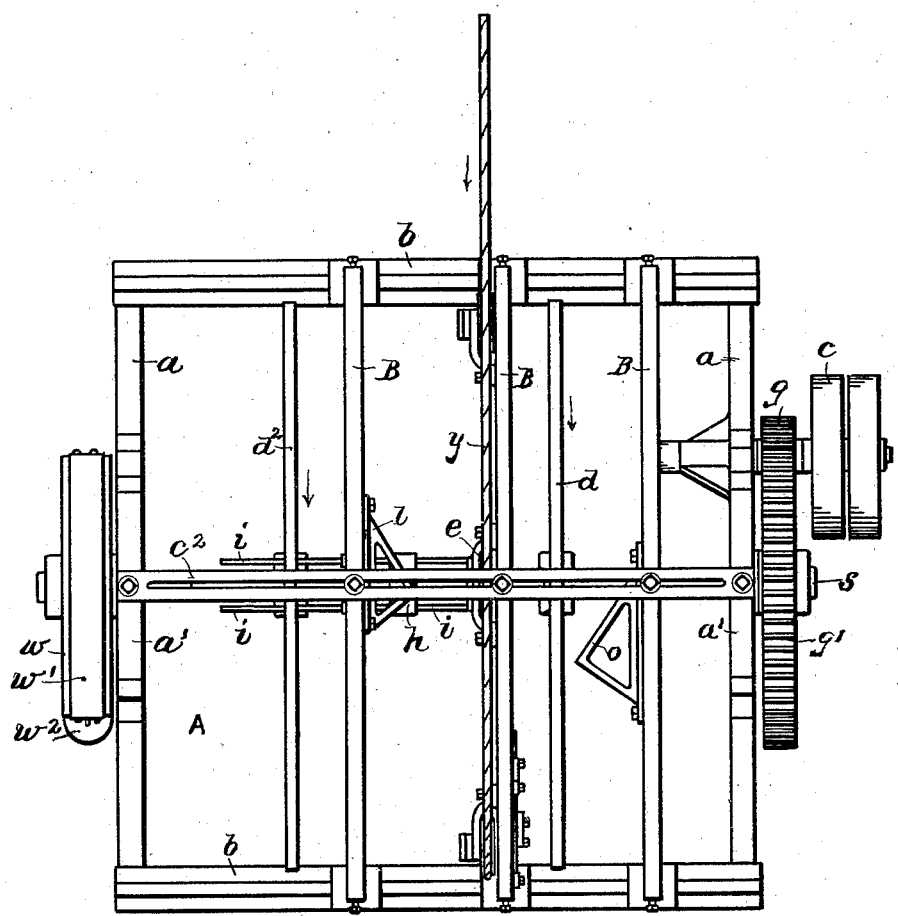

In the accompanying five sheets of drawings, Figure 1 is a front end elevation of my improved wood-turning machine. Fig. 2 is a side view of the same, some of the arbors and feeding devices being omitted. Fig. 3 is a corresponding plan view. Fig. 4 is a partial plan view in enlarged scale. Fig. 5 is a longitudinal central sectional view taken on line 5 5 of Fig. 4. Fig. 6 is an enlarged transverse section taken on line 6 6 of Fig. 4. Fig. 7 is a central sectional view of the pulley arbor or chuck, taken on line 7 7 of Fig. 8. Fig. 8 is an end view of the same. Fig. 9 represents the opposite end. Fig. 10 is a partial front view showing an arrangement of the stationary cutters, &c., with respect to the traveling and revolving stock from which the articles are formed. Figs. 11 to 16, inclusive, are detached views of cutters employed or as indicated in Fig. 10. Fig. 17 is a side view of one of the wooden stock-bars in reduced scale, showing a turned article practically completed thereon before being severed from the bar; and Fig. 18 is a front view similar to Fig. 10, showing an arrangement of stationary devices for further finishing the articles thus formed on the rods.

The following is a more detailed description of my improved wood-turning machine and the manner of operating the same.

The machine is complete in itself or self-contained and is indicated in the drawings by A. It is provided with two suitably-united end frames $a$ $a$ and vertical extensions $a'$, in which are mounted and supported the several operative devices constituting the invention.

The horizontal drum-carrying shaft $s$, mounted in suitable bearings, is capable of being slowly revolved through the medium of a large gear $g'$, secured to the front end of the shaft, a pinion-gear $g$, meshing into said large gear, and a belt-driven pulley $c$, which in turn drives the pinion. (See Figs. 1 and 2.) The slowly-revolving member D, which I term a "drum," is adjustably secured to said shaft, and consists, essentially, of a series of two or more laterally-separated disks or heads, as $d$ $d'$ $d^2$, each being independently movable endwise upon the shaft $s$. At or near and around the periphery of the drum the heads or disks are provided with a series of suitably-spaced transversely-located holes adapted to receive therein removably-secured bushings or members, soon to be described. The axes of the said holes formed in the heads register with or are in alinement with one another.

The bushings $m$, (see Figs. 4 and 5,) mounted in the front end or head $d$ of the drum, carry each a hollow or female centering member $m'$. It is also adapted to carry a suitable endwise-movable non-revoluble tool or drill-holder $d^4$, having a pin $m^3$, extending outwardly through a longitudinally-slotted opening $m^2$. The said member $d^4$ is arranged to receive the shank of a tool or drill, as $d^5$. As thus arranged, the drill is capable of being projected through the centering member $m'$ and into the center of the rapidly-revolving stock or wooden rod $z$, held adjacent thereto in the drum. The action of the slowly-turning drum causes the pin $m^3$ to engage a fixed cam or dog $o$, located in the path thereof, thus forcing the drill endwise until the said pin passes the apex of the cam, at which instant a spring $s'$, carried by the drum, automatically retracts the pin and drill to the normal position. The opposite or rear end disk or head $d^3$ of the drum is provided with a series of bushings $k$, arranged each to receive therethrough the bar or stock $z$. The other or intermediate disk $d'$ is as drawn (see Figs. 4, 5, and 6) drilled to receive in each hole a hub of the small rapidly-revoluble pulley $e$, a removable cap or yoke $e^2$, secured to the disk, being employed to form a bearing and support the other hub of the pulley. The latter is mounted on and rigidly secured to a central hollow arbor or chuck $e'$, its rear portion being slotted longitudinally, as at $f^2$, and having secured to its face a series of thin radially-arranged sharpened gripping-dogs $f$. The end portions of the central hole extending through the chuck is substantially the same diameter as that formed in the bushing $k$ for the passage of the stock-bar $z$. As thus constructed, the jaws of the chuck are slightly resilient, thereby permitting the stock to be forced ahead endwise therein. The dogs $f$ after the rod has been fed or advanced snugly grip the same and effectually hold it in position and prevent the same from accidental movement. The other or front end portion of the chuck is also slotted and provided with a series of (as drawn) four thin longitudinally-extending sharpened dogs $f^3$, which also engage the work or rod and prevent it from turning axially independently of the pulley.

The following is a detailed description of the feeding device: Secured to and extending rearwardly from the said yoke $e^2$ are located a pair of horizontal laterally-separated parallel guide-rods $i$ $i$, the opposite or rear portions of which pass through holes therefor in the disk $d^3$, thereby forming slidable guides or supports for the rods. These latter support or carry a slidable head or block $h$ thereon, provided with a central removable bushing or sleeve $h'$, adapted to receive therein the stock or bar $z$. (See Figs. 4 and 5.) To the upper side of the member $h$ is mounted a hinged or slightly-movable L-shaped dog or lever $h^3$, having secured to its outer face a steel spur $h^2$, capable of being forced downwardly into the surface of the rod $z$. Stop-collars $k'$ are adjustably secured to the guides $i$. These serve to limit the rearward movement of the sliding head $h$. A suitable spring $h^5$, pressing against a lug $h^4$, depending from the head member, Figs. 2 and 5, is employed to maintain the latter in normal engagement with the stop. A stationary cam $l$ is secured to one of the arched braces or ties B, the arrangement being such that the rotary movement of the drum causes the said dog $h^3$ to engage the working side of said cam, thereby pressing the spur $h^2$ into the wood and at the same time gradually forcing the member $h$ ahead (together with the stock held therein) until the dog passes the cam's apex, thus completing the feeding operation. The spur-carrying jaw or lever readily releases the rod $z$, while the spring $h^5$ again returns the feeder to the normal position against the stops, as before stated. Obviously the length of "feed" or advance is easily controlled by the relative adjustment of the collars $k'$ to the cam's point. While the feeder is being retracted, the stock $z$, mounted therein, is prevented from moving rearwardly with it by means of the gripping-dogs $f$, before described. It may be added that the stock is temporarily non-revoluble during the feeding operation, because the belt $y$ is then disengaged from the then stationary pulley $e$.

The manner of turning, finishing, and severing the articles produced from the wooden stock-rods $z$ is substantially as follows: It is assumed, however, that the heads or disks of the drum D have been first adjusted upon the shaft $s$ and that the several series of bushings or hollow arbors $m$ $e'$ $h'$ $k$ (corresponding to the size or diameter of the stock-rods $z$) have been mounted in the drum. The arched ties or braces B are secured in position with respect to said disks and the feed and drill cams, as well as the several cutters, &c., properly adjusted and fixed in place. The machine is next set in motion, the driving-belt $c'$ operating to slowly revolve the drum, (see arrows,) while at the same time the round belt $y$, in engagement with the small pulleys $e$ of the drum, rapidly and simultaneously rotates the pulleys and the stock-rods $z$, mounted therein. The rods may be inserted in the drum while it is stationary or when it is in motion. In the latter case the attendant inserts them while the arbor-pulleys $e$ are temporarily inactive or disengaged from the continuously-traveling driving-belt $y$.

In case the product is to be drilled I prefer to arrange the stationary drill-operating cam $o$ whereby the traveling drum in its movement causes the drills to be successively acted upon by the cam, thereby producing a hole in the forward end of the corresponding rod. Each rod as thus drilled is next gradually advanced by the drum to the stationary cutting devices. Fig. 10 shows an arrangement of these latter. In this case four knives or cutters are employed. The front end portions of the rods are successively drilled, as just stated, then rough-turned by the initial cutters 1 and 2, finish-shaped by tool 3, followed by the use of tool 4, which, by the combined rotary movements of the drum and the rods thus acted upon, severs the now-completed product or article from the rod. Fig. 17 represents a stock-rod having a turned member $z'$ thereon just prior to being severed from it. The drum in its movement next carries the mounted revolving rods around to be again acted upon by the feeding mechanism, whereby the fixed cam $l$ successively advances each rod endwise through its respective pulley-arbor $e'$ and beyond the same to engage the centering member $m'$, followed by drilling, &c., as before described, the operation being automatically and continuously repeated until the rods are practically used up.

Sometimes it is desirable to further finish and oil or stain the articles $z'$ produced on my improved turning-machine. In such case they are or may be (before being completely severed from the rods) subjected to a sandpapering-tool $n$ or analogous device adjustably secured to one of the arched ties B, the same having depending flexible strips $n'$ arranged in the path of the revolving articles and faced with suitable abrading material—as fine sand, emery, &c.—as indicated in Fig. 18. Said figure also indicates an oiling or staining tool $r$. This, too, as drawn, is adjustably secured to said member B and is provided with a brush $r'$, communicating with a reservoir $r^2$, adapted to contain the oil or coloring fluid used, the same flowing therefrom to the brush, say, by gravity. The brush is located in the path of the rapidly-revolving rods. A suitable valve or member $r^3$ may be used to control the flow of liquid from the reservoir. In this arrangement it is obvious that the action thereof should be followed by the cutting-off operation.

It is obvious that the shape or form of the cutting-tools, as well as the arrangement and number of them used, will be governed by the size and form of the articles to be produced and also taking into account the kind of wood from which the rods $z$ are made. The cutters or reducing-tools may be adjustably secured to the face of the arched ties B by means of clamps $p$ and bolts $p'$, the latter passing through the clamps and into holes $p^2$, formed in said tie. (See Fig. 10.) These holes are spaced comparatively close together, thus providing for any range of adjustment. In setting the cutters the arrangement is such that the work to be performed by them is graduated or divided—that is, the action of the initial tool $l$ rough-turns the article being formed on the rod, the others successively removing the stock and completely shaping and severing it, substantially as before described.

I would state that for convenience in drawing the stationary feeding and drilling cams $l$ and $o$, respectively, are represented in Figs. 2, 3, and 4 as being comparatively close together with respect to the periphery of the drum. In any case, however, the feeding operation precedes that of drilling, &c. The feed-cam $l$ should preferably be located at some point on the arch B—say at or near the horizontal center or below the upper side of the continuously-traveling belt $y$, Fig. 1—so that the feed action is effected while the corresponding pulley and its rod are for the time non-revolving, although the drum itself is being slowly or normally revolved. This latter gradually advances the pulleys into engagement with belt $y$, which in turn causes them to rapidly revolve, as hereinbefore stated.

In charging or replenishing the drum with the stock-rods $z$, which operation, too, is effected while the pulleys $e$ are temporarily inactive or non-revolving, the attendant inserts the rods, one at a time, endwise through the drum until they are successively arrested by a suitable or swinging stop-gage $t$, mounted on one of the arches B or some other fixed member of the machine. (See Fig. 1.) As thus arranged the rod is inserted until its front end engages the rear side of said gage, thereby insuring that the rods extend a uniform or predetermined distance through the drum. Each rod as thus inserted into the drum is or may be next acted upon by the feeding device, which operation automatically advances the rod the proper distance to produce the article $z'$ thereon. As the rods in the moving drum lie in the path of the gage member $t$ the latter as it is successively engaged by them swings upwardly and permits the rods to pass. Fixed stops, as $t'$ $t^2$, limit the angular movements of the gage.

It will be seen that the machine, as drawn, is provided with three arched ties or braces B, the same being adjustably secured at their lower ends to the two fixed longitudinal ties $b$, uniting the end frames $a$. A similar tie $c^2$ connects the end frames centrally at the top. It also supports the ties B, as clearly shown.

I prefer to employ a tension device or brake for the drum in order to insure a more uniform action, it being understood that its normal speed is quite slow. As drawn, the drum-shaft has secured to its rear end a brake-pulley $w$, on the face of which is wrapped a strap $w'$, one end of the latter being fixed and stationary, the other end supporting a suitable weight $w^2$.

While it is usual in some forms of wood-turning machines employing stock in the form of rods $z$ to stop the same or at least some of its mechanisms or devices in order to introduce or replenish them with fresh rods, it is obvious that in my improved turning-machine the rods are inserted in the drum while it is in continuous action, and this may be easily and readily accomplished by a youthful attendant while the pulleys $e$ are temporarily inactive during the passage of the drum across the open space between the upper and lower sides of the continuously-traveling belt $y$. (See Fig. 1.) The charging of the drum is performed at the rear end of the machine.

While the machine illustrated herewith is comparatively short, it is obvious that it may be adapted to employ stock $z$ having any size and length within practical limits, the drum itself in such case being correspondingly modified. It is further apparent that the working capacity or output from the machine may be greatly multiplied, as desired, by simply increasing the number of the chucks, feeders, &c., in the drum to correspond with the number of stock-rods to be carried or mounted in it.

The machine may be provided with any well-known devices—as, for example, suitably-arranged friction-clutches—by means of which the starting and stopping of the belts $y$ and $c'$ can be readily controlled.

I do not claim, broadly, as my invention a wood-turning machine having a revoluble carrier adapted to receive a series of stock-rods which are successively turned or shaped.

I claim as my invention and desire to secure by United States Letters Patent—

1. In a wood-turning machine, provided with a slowly-revoluble drum or carrier D and a series of rapidly-revoluble work-holders mounted in said drum, each of said work-holders having a yielding or resilient hollow arbor and arranged to be driven by a continuously-traveling belt, the combination therewith of a corresponding series of guides and feeding devices also mounted in the drum and in axial alinement with said work-holders, a stationary cam or dog located in the path of said feeding devices arranged to engage with and successively actuate the latter, thereby mechanically advancing the stock or work $z$ through the holders and thus extending the same the desired distance beyond the front end of the drum, and stationary cutters or tools adapted to successively engage the said portion of the stock extending through the drum, substantially as shown and described.

2. In a wood-turning machine, the combination with a slowly-revoluble drum or carrier D and a series of rapidly-revoluble work-holders mounted in said drum, of a corresponding series of guides and feeding devices also mounted in the drum, means located in the path of said feeding device arranged to engage the latter to advance the work or stock $z$ beyond the front end or face of the drum, drilling devices mounted in the front end of the drum and in alinement with said feeding means, a stationary dog or cam adapted to actuate the drills in an endwise direction, and stationary cutters or tools arranged to successively engage the work or stock extending through the drum, substantially as described.

3. In a wood-turning machine, the combination with a revoluble drum D, of a pulley $e$ mounted to revolve in bearings secured to or integral with the drum, and a hollow arbor or chuck $e'$ secured to and passing through the center of said pulley, the walls of the front and rear end portions of said chuck being longitudinally slitted and slightly resilient and provided with spurs or dogs adapted to engage the stock or work $z$, substantially as hereinbefore described and for the purpose specified.

4. In a wood-turning machine, the combination with a revoluble drum D having a series of stock feeding and holding devices mounted therein, a corresponding series of spring-pressed drills mounted in the front end of said drum and being in alinement with the axes of said feeding and holding devices, and a stationary cam arranged to successively advance the drills into operative position with respect to the stock $z$, substantially as described.

5. In a wood-turning machine, the combination with a revoluble drum D provided with a series of stock feeding and holding devices, a normally stationary swinging stop-gage located contiguous to the front end of said drum and forming a gage against which the forward end of the stock abuts while it is being introduced into the drum, substantially as described.

Signed at Providence, Rhode Island, this 26th day of February, 1903.

JAMES R. BINNS.

Witnesses:
GEO. H. REMINGTON,
R. F. MORSE.